United States Patent

Engle

[11] Patent Number: 4,612,825
[45] Date of Patent: Sep. 23, 1986

[54] END CAP LIMITED SLIP DIFFERENTIAL

[75] Inventor: James L. Engle, Auburn, Ind.

[73] Assignee: Auburn Gear, Auburn, Ind.

[21] Appl. No.: 642,832

[22] Filed: Aug. 21, 1984

[51] Int. Cl.$^4$ .............. F16H 1/44; F16H 57/02; B23P 11/00

[52] U.S. Cl. .................. 74/711; 74/607; 29/434

[58] Field of Search ............ 74/711, 710.5, 607, 74/713, 715; 29/434

[56]  References Cited

U.S. PATENT DOCUMENTS

| | | | |
|---|---|---|---|
| 2,971,404 | 2/1961 | Thornton | 74/711 |
| 3,327,557 | 6/1967 | Mieras | 74/711 |
| 3,327,563 | 6/1967 | Engle | 74/711 |
| 3,365,983 | 1/1968 | Jeakle | 74/607 X |
| 3,400,611 | 9/1968 | Engle | 74/710.5 |
| 3,901,103 | 8/1975 | Hufstader | 74/607 X |
| 4,162,637 | 7/1979 | Altmann | 74/711 |
| 4,169,394 | 10/1979 | Estrada | 74/711 X |
| 4,491,035 | 1/1985 | Gleasman et al. | 74/715 |
| 4,495,835 | 1/1985 | Gleasman | 74/607 X |

*Primary Examiner*—Kenneth J. Dorner
*Assistant Examiner*—Stephen B. Andrews
*Attorney, Agent, or Firm*—Pearne, Gordon, Sessions, McCoy, Granger & Tilberry

[57] ABSTRACT

Limited slip differential mechanisms and assembly techniques therefore are disclosed providing enhanced strength and durability without increase in over all size. Positioning the parting plane of a two part differential mechanism case outside the chain of elements transmitting the torque through the differential mechanism while at the same time increasing the size of side and pinion gears within the case and modifying both the case interior machining technique and the technique for assembling the components within the case yields the strength and durability advantages.

17 Claims, 3 Drawing Figures

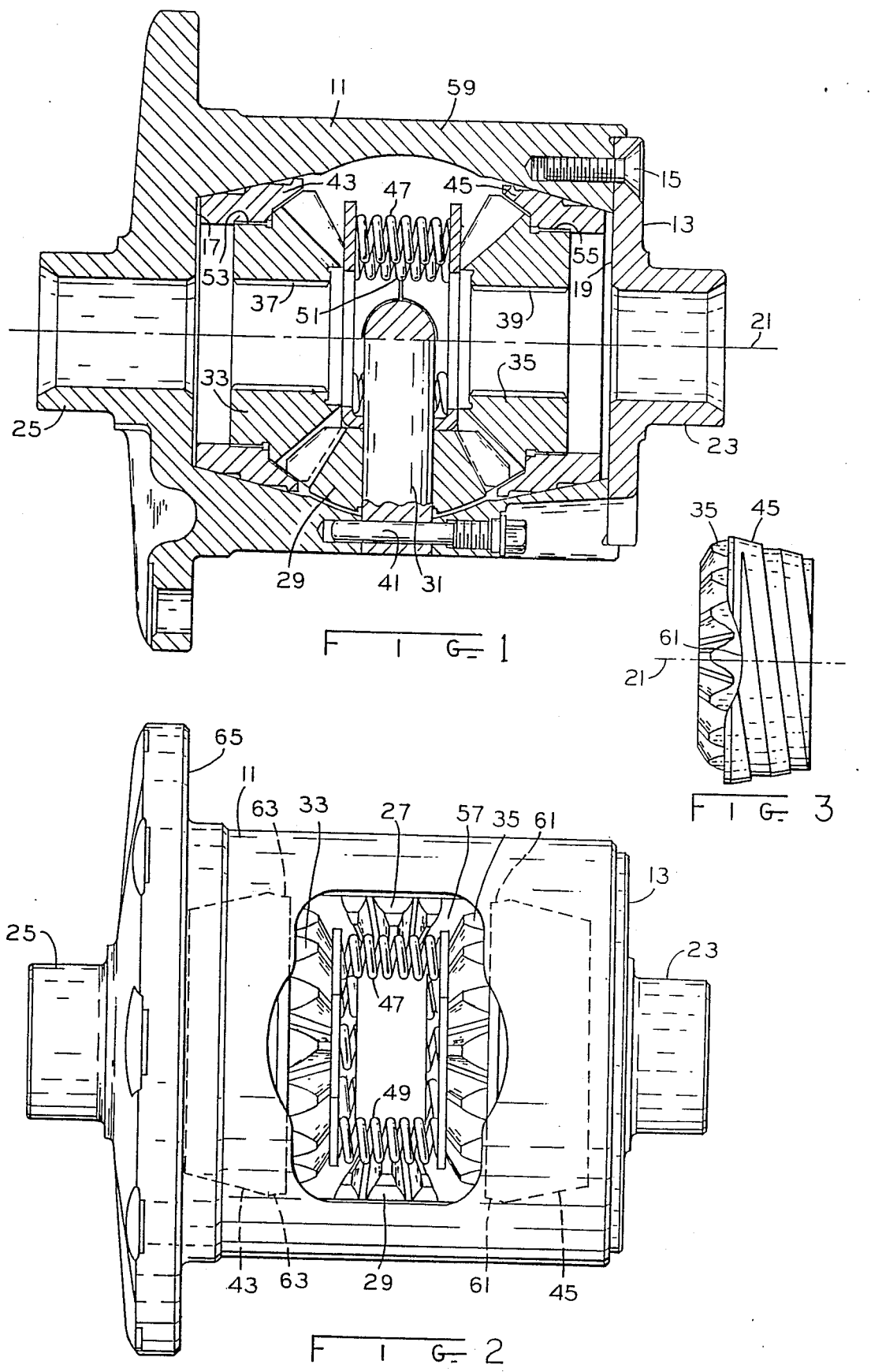

END CAP LIMITED SLIP DIFFERENTIAL

SUMMARY OF THE INVENTION

The present invention relates generally to differential mechanisms and more particularly to a limited slip differential mechanism with particular attention to the differential case and techniques for assembling clutch members, side gears and pinion gears in that case.

It has long been commonly known that in vehicles with laterally displaced wheels, when such a vehicle makes a turn the outer wheel or wheels must move further than the inner wheels and hence that a direct coupling between the outer and inner wheels, which forces those wheels to rotate in unison, necessarily induces some slippage between a wheel and the support surface during a turn. On the other hand, when more than one wheel receives a driving force, it is desirable that that force be transmitted as directly as possible to all of the driven wheels. On longstanding solution to this dilemma has been a conventional differential mechanism interconnecting a pair of driven wheels on a vehicle wherein each wheel is directly coupled by way of an axle shaft to a side gear within a differential housing. The side gears are in turn interconnected by a pair of beveled gears fixed by way of a cross pin to a so-called differential case. The differential case receives the driving torque from the vehicle engine and during linear vehicle motion the differential case and axle shafts rotate in unison with no relative motion between the side gears or pinion gears. During turning and differential action by the mechanism, one side gear associated with the outer wheel turns faster than the side gear coupled to the inner wheel while both wheels continue to receive driving force. Such mechanisms adequately solve the problem on dry pavement or other comparatively hard surfaces, however, for example, in snow or mud, in the event that one of the two driven wheels begins to slide or freely rotate, there is essentially no torque transmitted to the other of the pair of driven wheels and the vehicle is stuck simply because one of its two driven wheels is allowed to slip. Attempts to combat this latter problem include in addition to four wheel drive or other such attempts to supply power to a greater number of wheels, the addition of a clutch like structure within the differential mechanism so that differentiation may occur only after a predetermined torque level is reached. This ensures that both of the driven wheels will receive at least this predetermined minimum torque, even though one of those two wheels is freely sliding as on snow or ice. One such limited slip differential mechanism marketed under the name "Positraction" employed a stacked series of clutch plates and disks each of generally flat annular configuration with the plates and disks spring biased into contact with one another to provide a friction coupling between the differential case and one side gear with clutch slippage occuring only after a prescribed torque level is reached.

Another limited slip differential mechanism is illustrated in U.S. Pat. No 3,400,611 wherein a pair of frustoconical clutch members engage corresponding conically shaped inner surfaces of a differential case. Differential mechanisms in accordance with this patented arrangement have been successfully marketed by applicant's assignee for a number of years and have met with widespread commercial success. Purchasers of this type differential mechanism have designed and built differential housings or carriers to receive devices, such as illustrated in the U.S. Pat. No. 3,400,611 and having committed large sums of money to such differential housings, those housings cannot now be cost effectively increased in size. This in turn limits the outer dimensions of differential mechanisms manufactured by applicant's assignee and living within those outside dimensional limitations, applicant was faced with the problem of strengthening the differential mechanism without increasing the outer dimensions thereof to meet the increased demands of larger and more powerful engines.

Among the several objects of the present invention may be noted the provision of a differential mechanism similar to that disclosed in the aforementioned patent, but of enhanced mechanical strength without a correlative increase in over all size; the provision of improved assembly techniques for differential mechanisms of the aforementioned patented type; the provision of modifications to the differential mechanism case disclosed in the aforementioned patent which result in enhanced durability, more versatile machining and assembly techniques, and an increase in the usable space within the case without increasing the case exterior dimensions; and the provision of a two part case for a differential mechanism wherein the torque transmitted by the case is confined to one part only thereof. These as well as other objects and advantageous features of the present invention will be in part apparent and in part pointed out hereinafter.

In general, a limited slip differential mechanism includes an at least two part case having a generally hollow barrel shaped interior with opposed generally planar end walls and a bulged surface of revolution side wall, the entirety of which is formed within one of the case parts. A differential gear assembly within the housing includes a pair of pinion gears, a cross pin diametrically spanning the case for journaling the pinion gears along with an arrangement to prevent radial cross pin movement. Other than the cross pin and the pin movement preventing arrangement, the case side wall radially surrounding the pinion gears is free of other components of the mechanism allowing this case side wall portion to be made somewhat thinner than heretofore possible.

Also, in general and in one form of the invention, a limited slip differential mechanism has a two part case with one case part forming a generally planar end wall and the other case part including a generally hollow barrel shaped interior portion. Axle shaft receiving hubs extend coaxially from the case end walls and a side wall of the case includes an access port for assembling components within the case interior.

Still further in general and in one form of the invention, a limited slip differential mechanism is assembled in a two part hollow case having an access port in a side wall of on part only of that case by surface finishing inner portions of the one case part to provide a pair of oppositely opening frustoconical clutch surfaces and then assembling a pair of cone clutch members, a pair of axle receiving side gears, and a pair of pinion gears within the case through the access port. Compressed springs may be included between the side gears to urge the side gears and therefore also the cone clutch members away from one another and into engagement with the corresponding frustoconical surfaces of the case with such clutch surface engagement being independent of whether the two parts of the case are joined or not.

With such a technique the components may be assembled inside the housing either before or after surface finishing of exterior portions of the case.

BRIEF DESCRIPTION OF THE DRAWING

FIG. 1 is a revolved cross sectional elevational view of a differential mechanism incorporating one form of the invention;

FIG. 2 is an elevational view of the differential mechanism of FIG. 1 with the access port exposed; and FIG. 3 is a view of the side gear 35 and cone clutch member 45 removed from the case with gear 33 and clutch member 43 being substantially identical thereto.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawing generally, the general structure and operation of the differential mechanism will be briefly described and reference may be made to the aforementioned U.S. Pat. No. 3,400,611 for further details of operation not pertinent to the present inventive improvements. Accordingly, the entirety of U.S. Pat. No. 3,400,611 is specifically incorporated herein by reference.

The outer shell of the limited slip differential mechanism illustrated in the drawing is formed of at least two joinable parts 11 and 13 which when joined by screws, such as 15, form the hollow case for the mechanism. The case has a generally hollow barrel shaped interior with planar end walls 17 and 19, and a bulged side wall which is formed as a surface of revolution about the axis 21. Axis 21 is also the axis of a pair of axle shafts (not illustrated), is the axis about which the mechanism normally rotates when in use and is further the axis of the axle shaft receiving hubs 23 and 25.

The components within the case include a differential gear assembly comprising a pair of pinion gears 27 and 29 journaled on a cross pin 31 which diametrically spans the case and a pair of side gears 33 and 35 having interior splines 37 and 39 for receiving correspondingly splined portions of the axle shafts. Cross pin 31 diametrically spans the case midway between the end walls and is locked in position so as to not move radially by a partially threaded dowel pin 41.

Further components within the case include a pair of cone clutch members 43 and 45 and compression springs, such as 47, 49 and 51, which urge the side gears 33 and 35 away from one another and in turn such urging of the side gears 33 and 35 urges the cone clutch members 43 and 45 into clutching engagement with correspondingly conically shaped surface portions of the case interior. An outer annular region of the side gears and an inner annular region of the cone clutch members, may be splined together as at 53 and 55.

The differential mechanism case of the aforementioned U.S. Pat. No. 3,400,611 was a two part case as is the case of the present invention, however, in the aforementioned patented arrangement that case had a parting plane generally perpendicular to the axis 21 and passing generally through the center line of the cross pin 31.

Thus, in the prior patented arrangement the internal components of the differential mechanism could be assembled within the case and then the two case parts joined. Also in the prior patented arrangement, machining of the interior portions of the case was performed prior to assembly of the component therein and finally joining of the two case halves. The bolt arrangement joining those two case halves was, in the prior device, located generally radially outwardly of the pinion gears and cross pin, thus necessitating a comparatively thick case side wall in those radially outward regions. In contradistinction, cross pin 31, dowel pin 41, and the access port 57 of FIG. 2 are the only interruptions in an otherwise uniform uninterrupted housing side wall portion as at 59 radially surrounding the pinion gear-cross pin assembly. This allows the side wall region 59 to be thinner and hence for the same outside diameter, the area available for pinion gears 27 and 29 is increased. In one commercial embodiment of the prior patented arrangement, a two inch diameter and about five-eighths of an inch thick pinion gear was employed, however, using the techniques of the present invention and maintaining the outside case diameter, a pinion gear of nearly two and one-half inches in diameter and slightly over three quarters of an inch thick may be employed. A corresponding increase in side gear size and strength is similarly now possible.

Still comparing the present invention to the aforementioned patented arrangement, internal machining of the case occurs with the two case parts 11 and 13 separated, however, in the present invention the entirety of the barrel shaped surface of revolution is machined in the one case part 11 whereas the two case halves previously were similarly machined. Once that internal machining is completed, the present invention allows for the assembling of all the internal components within case part 11 whether or not the two case parts 11 and 13 are joined. This is accomplished by way of the access port 57 of FIG. 2 through which each of the components may be inserted into the case housing. Notice that the skirts or bases of the two cone clutch members are undercut as at 61 and 63 as best seen in FIG. 3 with the access port 57 being similarly undercut to allow insertion of the pinion gears 27 and 29. Such an assembly technique allows the external machining of the case either before or after the assembling of the components within the case. Such machining includes ensuring prope alignment of the inner surfaces of the shaft receiving flanges 23 and 25, as well as machining of the ring gear receiving flange 65. The ring gear attached to flange 65 transmits by way of that flange, the torque to the housing 11, with that torque in turn causing normal rotation of the housing about axis 21. In the present device this torque is transferred to the cross pin 31 quite independent of any coupling between the two case parts 11 and 13, however, in the prior patented arrangement the two housing halves met in semicircles about cross pin 31 and some slippage and deformation between the housing halves could occur during torque transmission. With the cross pin 31 now passing through diametrically opposed side wall holes and the entirety of those holes lying within the case part 11, such deformation and slippage is eliminated leading to an over all strengthened differential mechanism.

Thus, removing the parting plane from the axis of the cross pin and fabricating the case housing as essentially one part 11 and an end cap 13 allows for the use of smaller and cheaper fasteners 15 to attach the end cap 13; reduced case thickness at 59 allowing for larger and more sturdy pinion gears and side gears within the case; and eliminates deformation of the two semicylindrical holes formerly surrounding the cross pin 31 during the application of significant torque loads to the differential mechanism. This moving or shifting of the parting plane further allows for variations in the assembly sequence.

The assembly techniques and their versatility for limited slip differential mechanisms embodying the present invention should now be clear. A two part joinable generally hollow case 11, 13 with each part having an axle shaft receiving hub 23 and 25 which when joined has the hubs in spaced coaxial alignment along axis 21 is provided with an access port 57 including the pinion gear passing enlargements 61 and 63. The inner barrel shaped portion of case part 11 is surface finished to provide a pair of oppositely opening frustoconical clutch surfaces within the case and thereafter a pair of cone clutch members 43 and 45, a pair of axle receiving side gears 33 and 35 and a pair of pinion gears 27 and 29 are assembled within the case through the access port 57, compressed springs such as 47, 49 and 51, are positioned between the side gears to force those gears and therefore also the clutch cone members into engagement with the case inner conical surfaces. The case parts 11 and 13 are joined either before or after assembly of the components inside the case as by screws 15 and then once coaxiality of the flanges 23 and 25 has been established, other surface finishing, such as that of flange 65, to receive a ring gear is completed.

Of course, prior to the insertion of the clutch cone members 43 and 45, the diametrically opposed base portions of those cones may be undercut to provide the clearance at 61 and 63. With only one access port 57, one of the two pinion gear is inserted into engagement with each of the respective side gears 33 and 35 and then the internal components rotated relative to the case through 180° about axis 21, whereupon the second of the pinion gears is passed through access port 57. A subsequent 90° rotation allows lateral insertion of the cross pin 31 through the two pinion gears and anchoring of that cross pin by the dowel pin 41.

From the foregoing it is now apparent that novel limited slip differential mechanism, as well as a novel approach to the assembly techniques of such mechanisms, have been disclosed meeting the objects and advantageous features set out hereinbefore as well as others and the modifications as to the precise configuration, shapes and details may be made by those having ordinary skill in the art without departing from the spirit of the invention or the scope thereof as set out by the claims which follow.

What is claimed is:

1. The method of assembling a limited slip differential mechanism comprising the steps of:
   providing a two part joinable generally hollow case comprised of a first and second part, said first part being cup-shaped and having a first planar end wall and a bulged side wall terminating in a planar mouth, said second part comprising a second planar end wall, each part having an axle shaft receiving hub and, when joined, with the hubs in spaced coaxial alignment and with said planar mouth and second end wall comprising a parting plane for said hollow case;
   providing an access port in said side wall of said first part only of the case;
   surface finishing inner portions of said first part to provide a pair of oppositely opening frustoconical cluth surfaces within the hollow case, a first one of said pair of clutch surfaces being formed in said side wall and diverging radially outwardly from the intersection between said first planar end wall and said side wall, a second one of said pair of clutch surfaces being formed in said side wall and diverging radially outwardly from said planar mouth; and
   assembling a pair of cone clutch members a pair of axle receiving side gears and a pair of pinion gears within the case through the access port.

2. The method of claim 1 wherein the frustoconical clutch surfaces open toward one another and are positioned generally coaxially with the hubs, the step of assembling including disposing compressed spring means between the side gears thereby urging the cone clutch members away from one another and into engagement with the corresponding clutch surfaces independent of the joinder of the case parts.

3. The method of claim 1 including the additional steps of fastening the case parts together and surface finishing outer case portions.

4. The method of claim 3 wherein the steps of providing a case, providing an access port, surface finishing inner portions, fastening case parts together, and surface finishing outer portions are performed in the stated order while the step of assembling may be performed at any time after the step of surface finishing inner portions.

5. The method of claim 1 including the additional step of passing a cross pin through a side wall hole wholly within said first part of the case and through each of the pinion gears to journal those gears for rotation about an axis generally orthogonal to the hub axis.

6. The method of claim 1 including, preliminary to the assembling step, the step of undercutting diametrically opposed base portions of the cone clutch members to provide clearance for subsequent passage of pinion gears through the access port, past the undercut base portions and into engagement with the side gears.

7. The method of claim 6 wherein one pinion gear is assembled into engagement with the side gears, the side gears, cone clutch members and pinion gear rotated one-half revolution about the axis of the hubs relative to the case and then the other pinion gear is assembled into engagement with the side gears.

8. A limited slip differential mechanism comprising:
   a housing formed by a two part case having a generally hollow barrel shaped interior with opposed generally planar first and second end walls and a bulged side wall formed as a surface of revolution, a first case part defining said barrel shaped interior and said first end wall and terminating in a planar mouth, a pair of frustoconical clutch surfaces formed on the interior of said first case part, a first one of said pair of clutch sufaces being formed in said side wall and diverging radially outwardly from the intersection between said first planar end wall and said side wall, a second one of said pair of clutch surfaces being formed in said sidewall and diverging radially outwardly from said planar mouth, a second case part comprising said second end wall and, with said planar mouth, forming a parting plane for said case;

axle shaft receiving hubs extending from the end walls coaxial with the axis of the surface of revolution; and an access port in the side wall for assembling components within the interior.

9. The differential mechanism of claim 8 wherein the components include a pair of cone clutch members, a pair of axle receiving side gears, a pair of pinion gears, and compression springs for urging the cone clutch members away from one another and into engagement with said frustoconical clutch surfaces formed on the interior of said first case part.

10. The differential mechanism of claim 9 further including a cross pin passing through each of the pinion gears and spanning the housing interior midway between the end walls, the cross pin lodged in diametrically opposed sidewall holes.

11. The differential mechanism of claim 10 wherein said one case part includes a ring gear receiving flange for transmitting torque to the housing inducing rotation of the housing about said axis with such torque being transferred to the cross pin independent of any coupling between the two case parts.

12. The differential mechanism of claim 10 further including a dowel pin passing transversely through the cross pin and a portion of said first case part for preventing radial movement of the cross pin relative to the case, the cross pin, dowel pin and access port being the only interruptions in an otherwise uniform uninterrupted housing side wall portion radially surrounding the pinion gear-cross pin assembly.

13. A limited slip differential mechanism comprising a housing formed by an at least two part case having a generally hollow barrel shaped interior with opposed generally planar first and second end walls and a bulged side wall formed as a surface of revolution around the axis about which the mechanism normally rotates, a first case part defining barrel-shaped interior and said first end wall and terminating in a planar mouth, a pair of frustoconical clutch surfaces formed on the interior of said first case part, a first one of said pair of clutch surfaces being formed in said side wall and diverging radially outwardly from the intersection between said first planar end wall and said side wall, a second one of said pair of clutch surfaces being formed in said sidewall and diverging radially outwardly from said planar mouth, a second case part comprising said second end wall and, with said planar mouth, forming a parting plane for said case; and a differential gear assembly within the case including a pair of pinion gears, a cross pin diametrically spanning the case and journaling the pinion gears, and means preventing radial pin movement; the case side wall radially surrounding the pinion gears receiving the cross pin and pin movement preventing means and otherwise being free of other components of the mechanism.

14. The differential mechanism of claim 13 further comprising axle shaft receiving hubs extending from the end walls coaxial with the axis of the surface of revolution.

15. The differential mechanism of claim 13 wherein the sidewall includes an access port for assembling components of the differential gear assembly within the housing interior.

16. The differential mechanism of claim 15 wherein the components further include a pair of cone clutch members, a pair of axle receiving side gears, and compression springs for urging the cone clutch members away from one another and into engagement with the housing interior.

17. The differential mechanism of claim 13 wherein the case is formed of exactly two parts, said first case part including a ring gear receiving flange for transmitting torque to the housing inducing rotation of the housing about the axis with such torque being transferred to the cross pin independent of any coupling between the two case parts.

* * * * *